(12) United States Patent
Takada (10) Patent No.: US 6,382,847 B1
(45) Date of Patent: May 7, 2002

(54) SHUTTER MECHANISM (75) Inventor: Noboru Takada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/427,704

(22) Filed: Oct. 27, 1999

(30) Foreign Application Priority Data

Nov. 20, 1998 (JP) ............................................. 10-331447

(51) Int. Cl.[7] ................................................. G03B 9/08
(52) U.S. Cl. ......................................... 396/452; 396/483
(58) Field of Search ................................. 396/429, 452, 396/483, 492, 493, 494, 495, 463; 352/204, 208, 219

(56) References Cited

U.S. PATENT DOCUMENTS

| | | | |
|---|---|---|---|
| 1,020,383 A | * | 3/1912 | Cameron ..................... 226/114 |
| 4,334,749 A | | 6/1982 | Saito et al. |
| 4,500,187 A | | 2/1985 | Endo |
| 4,547,051 A | | 10/1985 | Swinehart |
| 4,699,483 A | | 10/1987 | Swinehart |
| 4,954,860 A | * | 9/1990 | Nakagawa et al. ......... 396/487 |

* cited by examiner

*Primary Examiner*—David M. Gray
*Assistant Examiner*—Arthur A Smith (57) ABSTRACT

A rotary plate has an eccentric shaft and a recessed portion which are spaced from a rotary shaft. A shutter is connected to the eccentric shaft by a swing arm which is rotatable about the eccentric shaft. A pin is provided on the swing arm. When the rotary plate starts rotating from a closed condition of the shutter, the swing arm moves linearly to release the shutter even when the shutter freezes to the casing. When the swing arm further rotates, the pin engages with the recessed portion of the rotary plate. The swing arm is integrated with the rotary plate. The shutter is quickly opened. When the shutter is fully opened, the pin disengages from the recessed portion. As the eccentric shaft is located adjacent to the rotary shaft, a large force is transmitted to the shutter. Thus, it becomes possible to use a low-power motor to release the shutter from the camera casing even when they freeze together.

5 Claims, 6 Drawing Sheets

SHUTTER MECHANISM

BACKGROUND OF THE INVENTION

The present invention relates to a shutter mechanism of a camera casing installed on a vehicle, and more particularly relates to a shutter mechanism capable of releasing a shutter from the casing when the shutter freezes to the camera casing.

An automotive camera is installed on a vehicle body for outdoor use. Such outdoor cameras are usually subjected to severe weather conditions including rain and snow. To protect the camera, the camera casing is usually equipped with a shutter. The shutter is closed when the camera is not used for photographing. The outside air temperature decreases in the winter season. The water or moisture component entering in a narrow space between the casing and shutter may freeze in such a low temperature condition. When the shutter freezes to the casing, a very large force is required to release the shutter from the casing against the binding force of ice. For this reason, the shutter is driven by a high-power motor. Alternatively, it is possible to provide another mechanism which is specially operable for releasing the frozen shutter from the camera casing. In this case, the shutter may be opened or closed by using a low power motor.

Figure 6A:
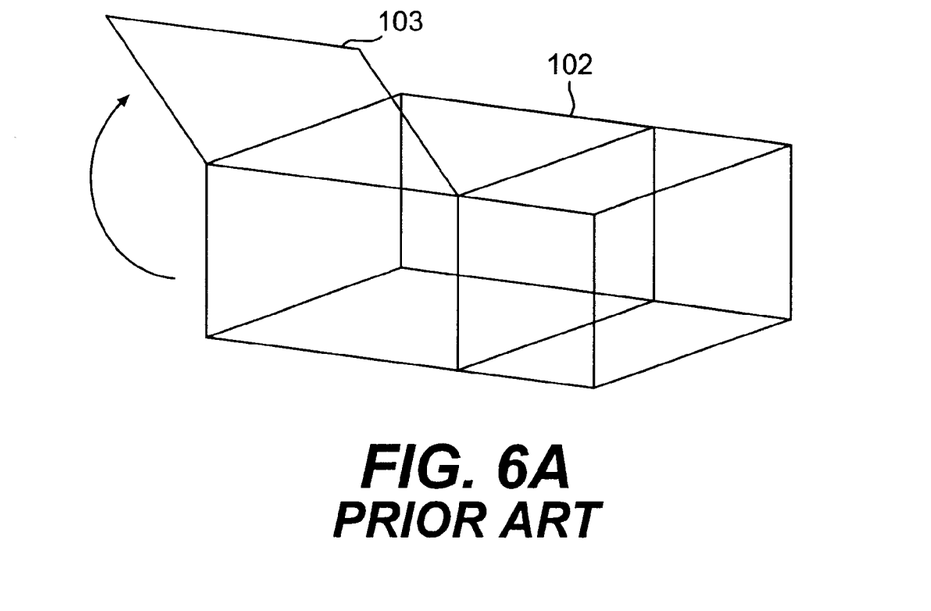
FIGS. 6A and 6B are views illustrating an operation of a conventional shutter mechanism.
Figure 6B:
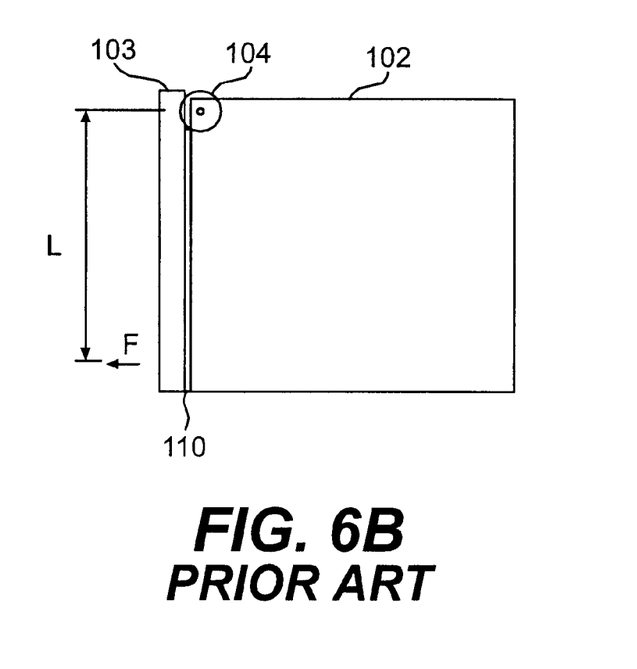

FIGS. 6A and 6B cooperatively illustrate a shutter motion of a conventional camera casing. As shown in FIG. 6A, a shutter 103 of length L is swingable about a hinge 104 provided at an edge of the shutter 103. FIG. 6B shows a closed condition of the shutter 103. In this closed condition, the water or moisture component may freeze in a narrow space between shutter 103 and the casing 102. To release the shutter 103 from ice 110 by a pulling force F, a torque of approximately F×L/2 is required.

Figure 7A:
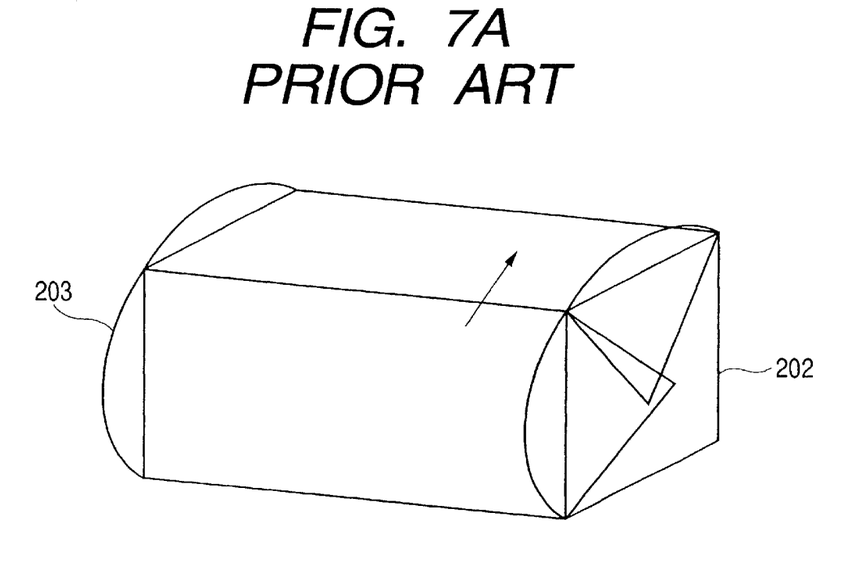
FIGS. 7A and 7B are views illustrating an operation of another conventional shutter mechanism.
Figure 7B:
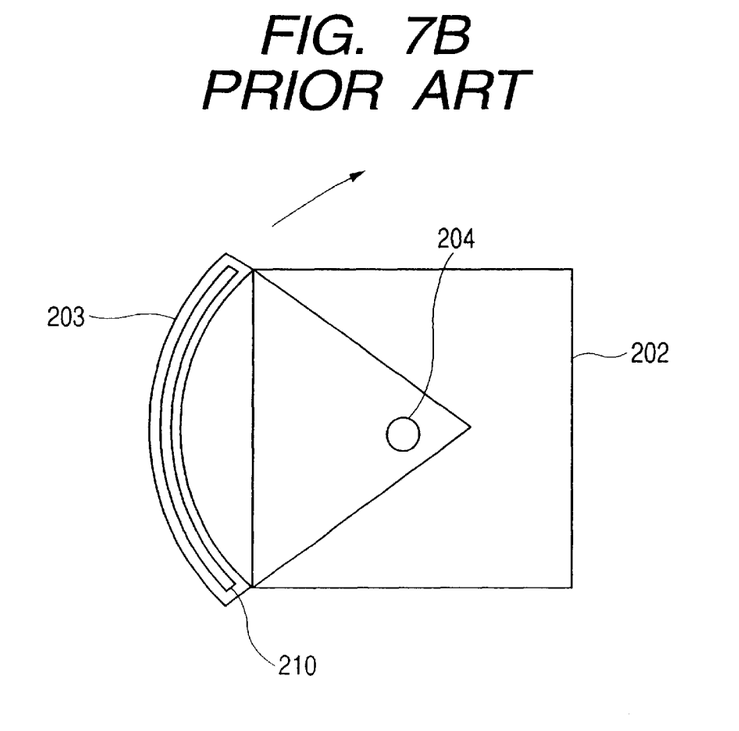

FIGS. 7A and 7B cooperatively illustrate a shutter motion of another conventional camera casing. As shown in FIG. 7A, a shutter 203 is similar to a quarter pipe and is swingable about a rotary shaft 204. FIG. 7B shows a closed condition of the shutter 203. When water or moisture component freezes in a narrow space between the shutter 203 and the casing 202, the shutter 203 needs to be released from the ice 210 by using a shearing force. It means that a very large torque is required to release the shutter 203 from the ice 210.

The above-described conventional shutter mechanism requires a large torque to release the shutter from the camera casing when the shutter freezes to the camera casing. It may be possible to employ a special releasing mechanism. However, the structure of the shutter mechanism will be complicated and the cost is increased. A low-power motor may be used for producing a large torque. However, it requires an enlarged size speed-reducing gear mechanism. When the speed-reducing gear mechanism has a large gear ratio, the open/close motion of the shutter becomes slow. It takes a relatively long time to open or close the shutter.

SUMMARY OF THE INVENTION

An object of the present invention is to provide a shutter mechanism which is capable of releasing the shutter from the camera casing by using a low-power motor when they freeze together and also capable of promptly accomplishing the open/close operation of the shutter.

In order to accomplish this and other related objects, the present invention provides a shutter mechanism comprising a rotary plate having an eccentric shaft and an engaging portion which are spaced from a rotary shaft. A driving member, such as a motor, is provided to drive the rotary plate. A swing arm of a shutter is connected to the eccentric shaft and rotatable about the eccentric shaft. An engaging member is provided on the swing arm. The swing arm is integrated with the rotary plate when the engaging portion of the rotary plate engages with the engaging member. And, the engaging member is disengaged from the engaging portion when a large torque acts on the swing arm.

With this arrangement, it becomes possible to release the shutter from the camera casing by using a low-power motor even when the shutter freezes to the camera casing. And also, it becomes possible to promptly accomplish the open/close operation of the shutter.

More specifically, the present invention provides a shutter mechanism comprising a rotary plate having an eccentric shaft and an engaging portion spaced from a rotary shaft of the rotary plate, a driving member for driving the rotary plate about the rotary shaft, a swing arm connecting a shutter to the eccentric shaft and rotatable about the eccentric shaft, and an engaging member provided on the swing arm, wherein the swing arm is integrated with the rotary plate when the engaging portion of the rotary plate engages with the engaging member of the swing arm, and the engaging member is disengaged from the engaging portion when a predetermined torque acts on the swing arm. The eccentric shaft is located near the rotary shaft. A small torque can be converted into a large force which is available for releasing the shutter from the camera casing even when the shutter freezes to the camera casing.

Preferably, the positional relationship between the eccentric shaft and the engaging portion of the rotary plate is determined in such a manner that the engaging member is separated from the engaging portion when the shutter is located at a predetermined closed position, the shutter moves linearly when the rotary plate starts rotating, the engaging member engages with the engaging portion after the rotary plate rotates a predetermined angle, thereby allowing the shutter to rotate. With this arrangement, it becomes possible to generate a strong force for releasing the shutter from the camera casing even when they freeze together. The shutter can be quickly opened.

Preferably, the engaging portion is provided in an opposed relationship with the eccentric shaft across the rotary shaft.

Another aspect of the present invention provides a method for driving a shutter connected to an end of a swing arm by rotating a rotary plate about a rotary shaft, wherein the swing arm is connected to an eccentric shaft spaced from the rotary shaft. The method comprises the steps of engaging an engaging portion with an engaging member in accordance with a rotation of the rotary plate so as to integrate the swing arm with the rotary plate and rotate the shutter together with the swing arm, and disengaging the engaging member from the engaging portion when a predetermined torque acts on the swing arm to cause the shutter and the swing arm to move linearly via the eccentric shaft. According to this method, a small torque can be converted into a large force which is available for releasing the shutter from the camera casing when they freeze together. The shutter can be airtightly closed by the large force.

Preferably, the engaging member is disengaged from the engaging portion when the shutter is in a predetermined closed condition or in a predetermined opened condition, so that the swing arm moves linearly along the track or trail of the eccentric shaft immediately after the rotary plate starts rotating or immediately before the rotary plate stops rotating. According to this method, a large force is available for opening and closing the shutter and the shutter can rotate speedily during the open/close motion.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Hereinafter, a preferred embodiment of the present invention will be explained with reference to FIGS. 1 to 5. Identical parts are denoted by the same reference numerals throughout the views.

A shutter mechanism of the preferred embodiment of the present invention comprises a rotary plate driven by a motor. An eccentric shaft and a recessed portion are provided on the rotary plate. A shutter, the eccentric shaft, and a pin are connected by a swing arm. When the rotary plate starts rotating, an operation for releasing the frozen shutter from the camera casing is performed. When the rotary plate further rotates, the pin engages with the recessed portion of the rotary plate. The swing arm and the shutter are integrated with the rotary plate. They rotate together. When the shutter is fully opened, the pin is disengaged from the recessed portion.

Figure 1A:
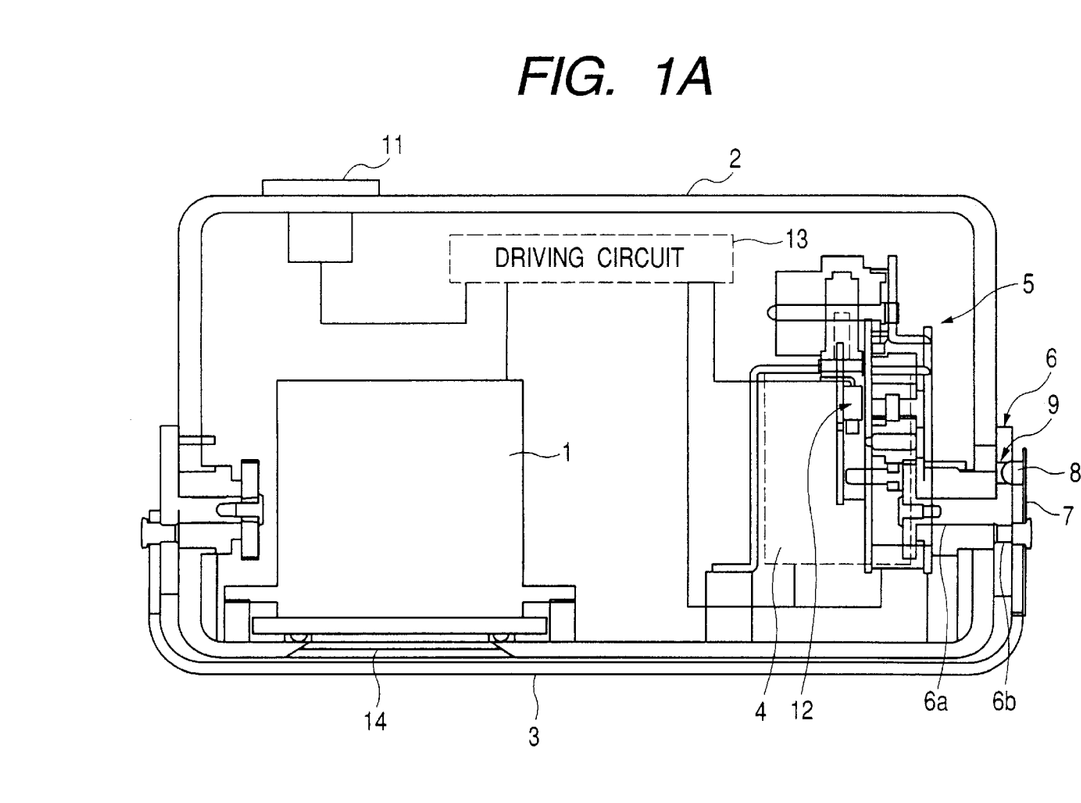
FIG. 1A is a plan view showing a shutter mechanism in accordance with a preferred embodiment of the present invention.
Figure 1B:
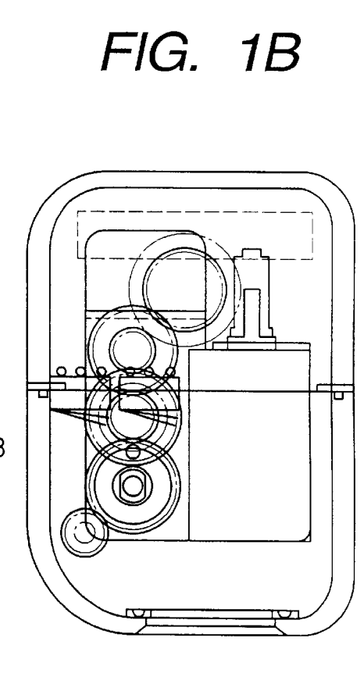
FIG. 1B is a side view showing the shutter mechanism in accordance with the preferred embodiment of the present invention.

FIGS. 1A and 1B cooperatively show a shutter mechanism in accordance with a preferred embodiment of the present invention. FIG. 1A is a plan view. FIG. 1B is a side view. In FIG. 1, a camera 1 is a video camera installed on a vehicle body. A casing 2 accommodates the camera 1. A shutter 3 closes a photographing aperture 14 of the camera 1. A motor 4 drives the shutter 3. A gear mechanism 5 serves as a speed-reducing means for changing the rotation of the gear mechanism 5 to the shutter 3 via a swing arm 7. The swing arm 7 is integral with the shutter 3 for guiding a swing or rotational movement of the shutter 3. A pin 8 serves as a means for connecting the swing arm 7 to the rotary plate 6. A recessed portion 9 serves as a means for receiving the pin 8 to engage the pin 8 to the rotary plate 6. A driving circuit 13 drives the camera 1 and the motor 4. A connector 11 connects the driving circuit 13 to a control unit provided in the vehicle. A switch 12 is used to on-and-off control the motor 4 which is driven via the driving circuit 13.

Figure 2A:
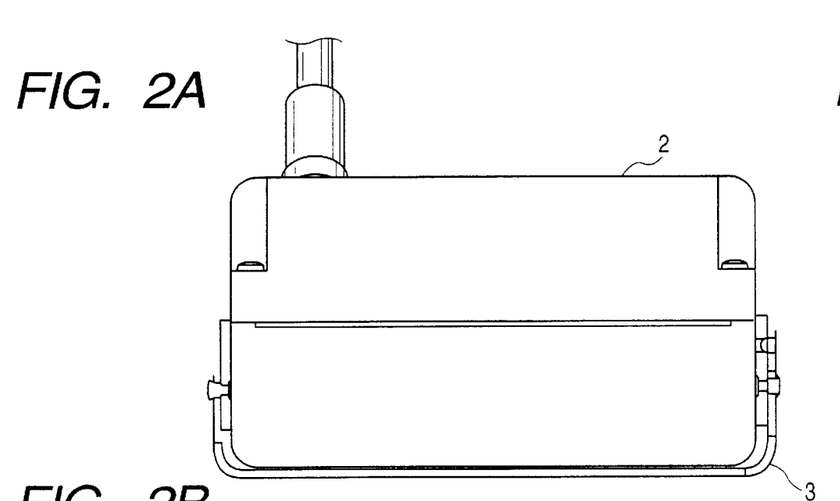
FIG. 2A is a plan view showing an appearance of the shutter mechanism in accordance with the preferred embodiment of the present invention.
Figure 2B:
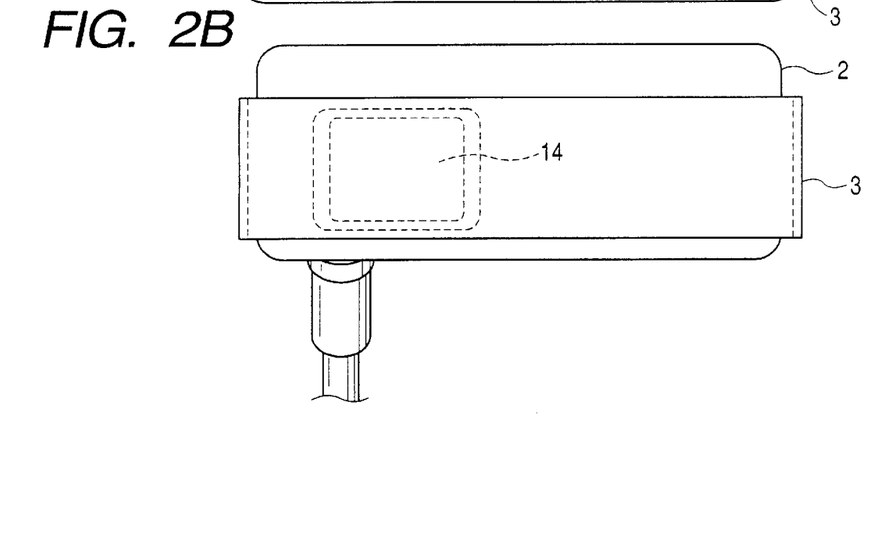
FIG. 2B is a front view showing the appearance of the shutter mechanism in accordance with the preferred embodiment of the present invention.
Figure 2C:
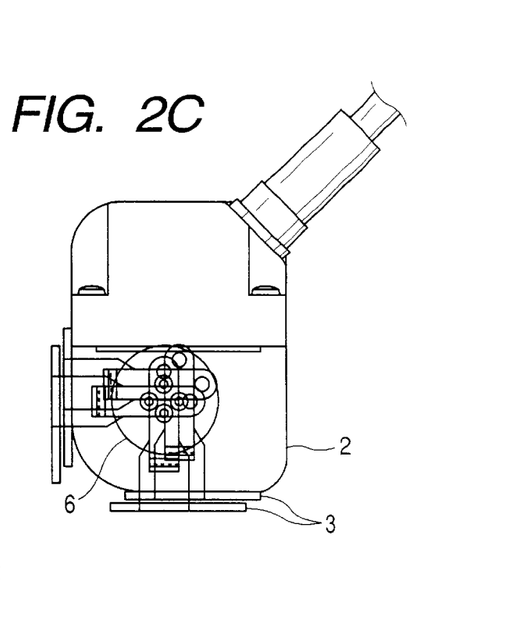
FIG. 2C is a side view showing the appearance of the shutter mechanism in accordance with the preferred embodiment of the present invention.

FIGS. 2A to 2C are three-sided views cooperatively showing an appearance of the camera casing 2 incorporating the shutter mechanism in accordance with the preferred embodiment of the present invention. FIG. 2A is a plan view. FIG. 2B is a front view showing one side of the camera casing on which the shutter 3 is located. FIG. 2C is a side view showing another side of the camera casing 2 on which the rotary plate 6 is provided.

Figure 3A:
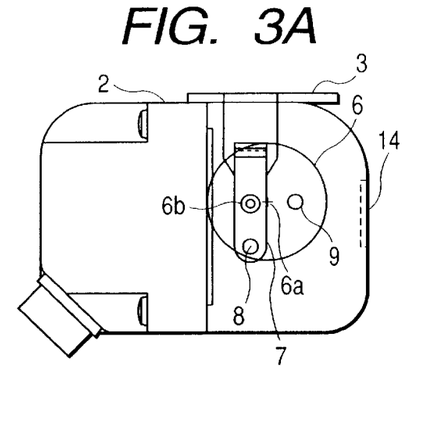
FIGS. 3A to 3F are views sequentially showing the operation of the shutter mechanism in accordance with the preferred embodiment of the present invention.
Figure 3B:
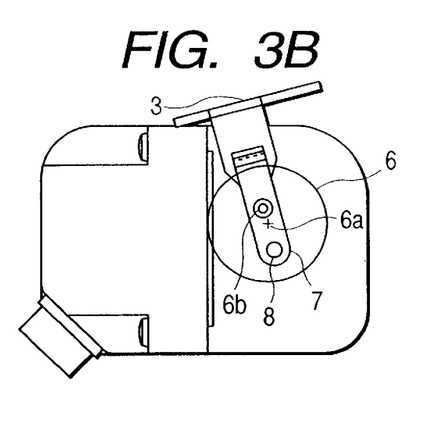
Figure 3C:
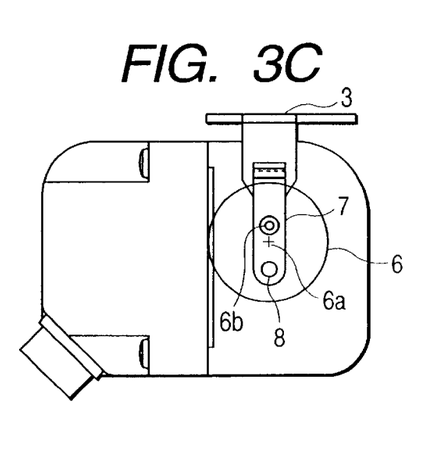
Figure 3D:
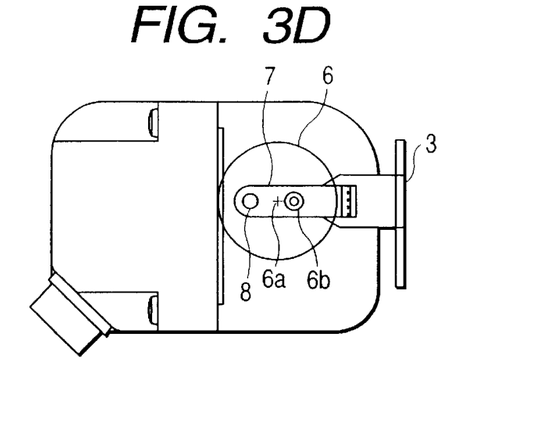
Figure 3E:
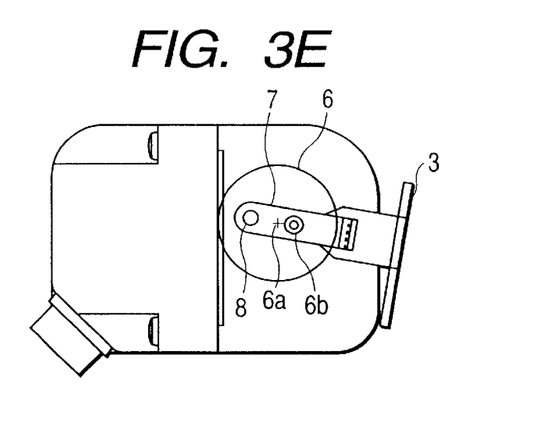
Figure 3F:
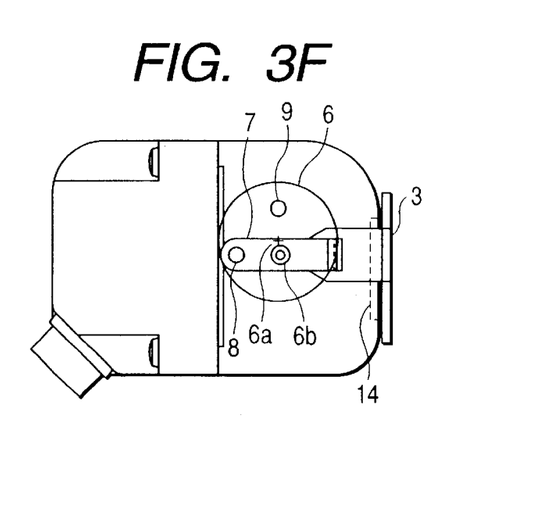

FIGS. 3A to 3F are views sequentially showing the operation of the shutter mechanism in accordance with the preferred embodiment of the present invention. FIG. 3A is a view showing an opened condition of the shutter 3 where the shutter 3 is swung upward (approximately 90°) to completely open the photographing aperture 14 of the camera 1. FIG. 3B is a view showing a rotation start condition where the shutter 3 is just integrated with the rotary plate 6 by the engagement between the pin 8 and the recessed portion 9. FIGS. 3C to 3E are views sequentially showing the rotation of the shutter 3 under the condition where the engagement between the pin 8 and the recessed portion 9 is maintained. FIG. 3F is a view showing a closed condition of the shutter 3 where the pin 8 is disengaged from the recessed portion 9 and the shutter 3 stops to completely close the photographing aperture 14.

Figure 4:
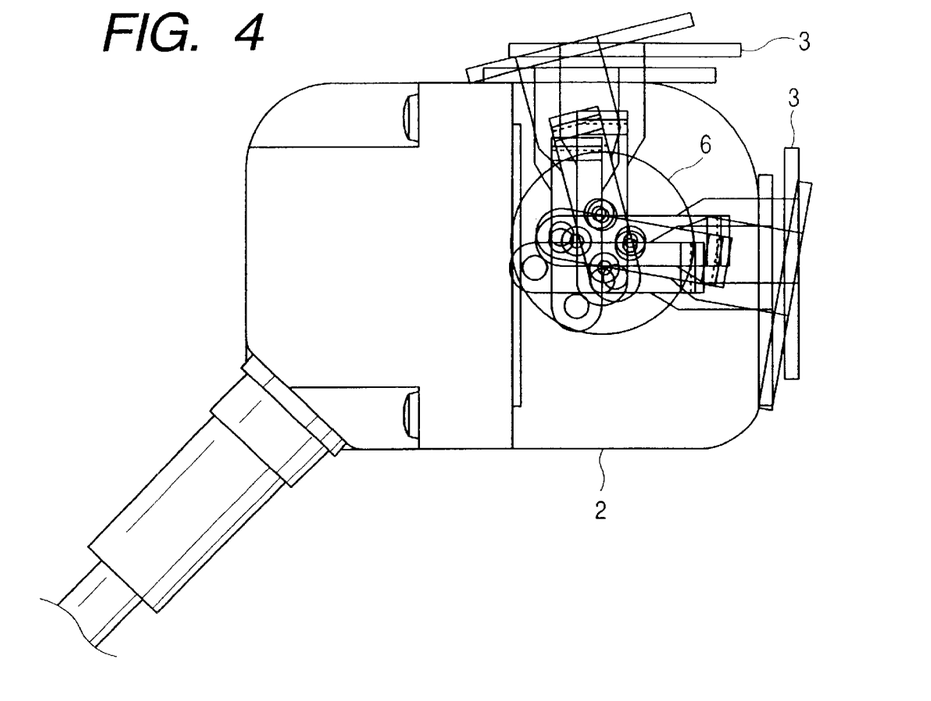
FIG. 4 is a side view collectively showing the operated conditions of the shutter mechanism in accordance with the preferred embodiment of the present invention.
Figure 5:
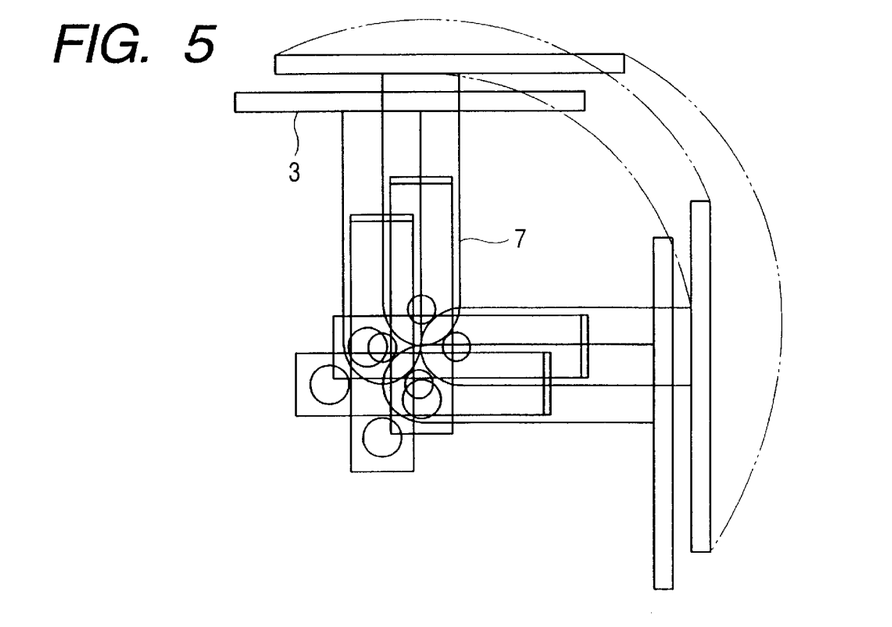
FIG. 5 is a view illustrating the shutter movement realized by the shutter mechanism in accordance with the preferred embodiment of the present invention.

FIG. 4 is a side view showing the operation of the shutter mechanism in accordance with the preferred embodiment of the present invention, corresponding to the overlap view of FIGS. 3A to 3F. FIG. 5 is a view showing the movement of the swing arm 7 and the shutter 3, corresponding the overlap view of FIGS. 3A, 3C, 3D and 3F. In FIG. 5, the casing 2 and the rotary plate 6 are omitted.

The shutter mechanism in accordance with the preferred embodiment of the present invention has the above-described arrangement. The detailed operation of this shutter mechanism will be explained with reference to FIGS. 1 to 5.

As shown in FIGS. 1 and 2, the casing 2 has the photographing aperture 14 at a predetermined position corresponding to the lens of the camera 1. The shutter 3 is provided to cover the photographing aperture 14. The shutter 3 rotates about the output shaft of the gear mechanism 5 which is connected to the motor 4. Thus, the motor 4 rotates the rotary plate 6 via the gear mechanism 5. The rotary plate 6 has a rotary shaft 6a located at the center thereof. The rotary shaft 6a is connected to the output shaft of the gear mechanism 5. The other swing arm of the shutter 3 is rotatably supported by a shaft fixed to an opposite surface of the casing 2.

An eccentric shaft 6b is located near the rotary shaft (i.e. central axis) 6a of the rotary plate 6. In other words, the eccentric shaft 6b is offset from the rotary shaft 6a. The swing arm 7 is rotatably supported by the eccentric shaft 6b. The swing arm 7 has one end integral with (i.e., stationarily connected to) the shutter 3. The pin 8 is provided on the opposite end of the swing arm 7. A spring is interposed between the pin 8 and the swing arm 7. Thus, the pin 8 is resiliently urged toward the rotary plate 6. Alternatively, it is possible to form the swing arm 7 so as to have a resiliently deformable end. In this case, the pin 8 can be directly attached to the resiliently deformable end of the swing arm 7. The pin 8 is resiliently urged toward the rotary plate 6 by the resilient force obtained from the swing arm 7.

The rotary plate 6 has the recessed portion 9 which is spaced from the rotary shaft 6a. The distance between the recessed portion 9 and the rotary shaft 6a is larger than the distance between the eccentric shaft 6b and the rotary shaft 6a. The recessed portion 9 serves as the engaging portion which is engageable with the pin 8. When a torque exceeding a predetermined value is applied between the rotary plate 6 and the swing arm 7, the pin 8 disengages from the recessed portion 9. Due to resiliency of the swing arm 7, the pin 8 receives a force acting in an obliquely upward direction from the recessed portion 9. The pin 8 is lifted upward by this force and exits out of the recessed portion 9. When the pin 8 engages with the recessed portion 9, the swing arm 7 and the rotary plate 6 are integrated to rotate the shutter 3. When the pin 8 disengages from the recessed portion 9, the swing arm 7 rotates about the eccentric shaft 6b of the rotary plate 6.

In the closing operation of the shutter 3, the motor 4 rotates to shift the shutter 3 linearly (i.e., raises the shutter 3 in the upper direction) from the opened position shown in FIG. 3A to the rotation start position shown in FIG. 3B. In this case, even if the shutter 3 freezes to the casing 2, the shutter 3 is easily released from the casing 2 because the shutter 3 is rotated by a larger force. When the rotary plate 6 further rotates, the pin 8 engages with the recessed portion 9. The shutter 3 is integrated with the swing arm 7 and they rotate together as shown in FIGS. 3B to 3E. FIG. 5 shows the positional change of the shutter 3 during this rotation (refer to arc lines).

When the shutter 3 comes to the position shown in FIG. 3E, the shutter 3 is blocked by the casing 2. The pin 8 receives a large reaction force from the casing 2 and is disengaged from the recessed portion 9. After exiting out of the recessed portion 9, the swing arm 7 rotates about the eccentric shaft 6b. The shutter 3 is pulled in by the large force so that the shutter 3 is airtightly brought into contact with the casing 2. When the swing arm 7 reaches the closed position shown in FIG. 3F, a limit switch (not shown) is depressed to stop the motor 4.

Next, the opening operation of shutter 3 is performed in the following manner. When the shutter 3 is positioned at the closed position as shown in FIG. 3F, a line connecting the recessed portion 9 of the rotary plate 6 and the eccentric shaft 6b across the rotary shaft 6a is perpendicular to the longitudinal direction of the swing arm 7. The pin 8 is disengaged from the recessed portion 9 in this condition. The pin 8 is pressed to the rotary plate 6 by the resilient force of the arm 7. When the rotary plate 6 rotates, the eccentric shaft 6b shifts the swing arm 7 linearly (i.e., pushes the shutter 3 in the forward direction) as shown in FIG. 3E. In this condition, the distance between the rotary shaft 6a and the eccentric shaft 6b is short. Thus, it is possible to push the swing arm 7 by a large force even when the motor torque is small. Thus, the shutter 3 is easily released from the casing 2 even when they freeze together.

When the rotary plate 6 further rotates, the pin 8 of the swing arm 7 engages with the recessed portion 9. The rotary plate 6 is integrated with the swing arm 7. The shutter 3 starts rotating, as shown in FIGS. 3E to 3B. As the shutter 3 is already released from the frozen condition, the shutter 3 can easily rotate by a small torque. Thus, the shutter 3 rotates quickly and accomplishes the opening operation.

When the shutter 3 comes to the position shown in FIG. 3B, the shutter 3 is blocked by the casing 2. The pin 8 receives a large reaction force from the casing 2 and is disengaged from the recessed portion 9. After exiting out of the recessed portion 9, the swing arm 7 rotates about the eccentric shaft 6b. When the swing arm 7 reaches the position shown in FIG. 3A, a limit switch is depressed to stop the motor 4. In this case, instead of using the limit switch, it is possible to detect an excessive load and stop the motor in response to the detected excessive load.

FIG. 4 shows the movement of the shutter 3 in the vicinity of the opened position as well as in the vicinity of the closed position. FIG. 5 shows the positional change of the shutter 3 during the rotation. The swing arm 7 can rotate about the eccentric shaft 6b after the pin 8 departs from the opened position until it engages with the recessed portion 9. Similarly, the swing arm 7 can rotate about the eccentric shaft 6b after the pin 8 departs from the closed position until it engages with the recessed portion 9.

The shape of the rotary plate 6 is not limited to a circular disk, and therefore can be modified into an appropriate shape as long as it has a sufficient size for receiving the pin 8 which rolls on the surface of the rotary plate 6. When the motor 4 has an appropriate torque and rotates at proper speeds, it may be possible to remove the gear mechanism 5. In this case, the motor 4 is directly and coaxially connected to the rotary plate 6. It is also possible to provide the recessed portion 9 on the swing arm 7 and provide the pin 8 on the rotary plate 6. In this case, the swing arm 7 has a disklike shape. The rotary plate 6 can be thinned. The pin 8 and the recessed portion 9 can be replaced by other comparable engaging members, such as magnets, which are separable when a predetermined force is applied.

As described in the foregoing description, according to the preferred embodiment of the present invention, the shutter mechanism is characterized in that the eccentric shaft 6b is provided at an offset position spaced from the rotary shaft 6a of the rotary plate 6 and the shutter 3 is connected to the eccentric shaft 6b via the swing arm 7. When the pin 8 of the swing arm 7 is engaged with the recessed portion 9 of the rotary plate 6, the shutter 3 is integrated with the rotary plate 6. When the rotary plate 6 starts rotating from the closed position, the shutter 3 is pushed by a strong force. Thus, it becomes possible to easily release the shutter 3 from the casing 2 even when they freeze together.

As apparent from the foregoing description, the present invention provides a shutter mechanism comprising a rotary plate having an eccentric shaft separated from a rotary shaft and an engaging portion, a driving member for driving the rotary plate, a swing arm connecting a shutter to the eccentric shaft and rotatable about the eccentric shaft, and an engaging member provided on the swing arm. The swing arm is integrated with the rotary plate when the engaging portion of the rotary plate engages with the engaging member. And, the engaging member is disengaged from the engaging portion when a predetermined torque acts on the swing arm. With this arrangement, it becomes possible to use a low-power motor to release the shutter from the camera casing installed on the vehicle body even when the shutter and the casing freeze together. After the shutter is released from the casing, the opening operation of the shutter can be promptly accomplished.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A shutter mechanism comprising:

a rotary plate rotatable about a rotary shaft; and a driving member for driving said rotary plate about said rotary shaft; and a swing arm guiding an open/close operation of a shutter;

wherein said rotary plate has an eccentric shaft and an engaging portion spaced from said rotary shaft of said rotary plate;

said swing arm connects said shutter to said eccentric shaft and is rotatable about said eccentric shaft;

an engaging member is provided on said swing arm;

said swing arm is integrated with said rotary plate when said engaging portion of said rotary plate engages with said engaging member; and said engaging member is disengaged from said engaging portion when a predetermined torque acts on said swing arm.

2. The shutter mechanism in accordance with claim 1, wherein the positional relationship between said eccentric shaft and said engaging portion of said rotary plate is determined in such a manner that said engaging member is separated from said engaging portion when said shutter is in a predetermined closed condition, said shutter moves linearly when said rotary plate starts rotating, said engaging member engages with said engaging portion after said rotary plate rotates a predetermined angle, thereby allowing said shutter to rotate about said rotary shaft together with said rotary plate.

3. The shutter mechanism in accordance with claim 1, wherein the engaging portion is provided in an opposed relationship with said eccentric shaft across said rotary shaft.

4. A method for driving a shutter connected to an end of a swing arm by rotating a rotary plate about a rotary shaft, wherein the swing arm is corrected to an eccentric shaft spaced from said rotary shaft, said method comprising the steps of:

actuating a driving member to rotate said rotary plate about said rotary shaft;

engaging an engaging portion with an engaging member in accordance with a rotation of said rotary plate so as to integrate said swing arm with said rotary plate and rotate said shutter together with said swing arm; and disengaging said engaging member from said engaging portion when a predetermined torque acts on said swing arm to cause said shutter and said swing arm to move linearly via said eccentric shaft.

5. The shutter driving method in accordance with claim 4, wherein said engaging member is disengaged from said engaging portion when said shutter is in a predetermined closed condition or in a predetermined opened condition, so that said swing arm moves linearly along a track or trail of said eccentric shaft immediately after said rotary plate starts rotating or immediately before said rotary plate stops rotating.

* * * * *